United States Patent [19]

Frye

[11] Patent Number: 4,548,117

[45] Date of Patent: Oct. 22, 1985

[54] NON-DULLING SLITTER

[75] Inventor: Kenneth G. Frye, South Egremont, Mass.

[73] Assignee: Beloit Corporation, Beloit, Wis.

[21] Appl. No.: 480,122

[22] Filed: Mar. 25, 1983

[51] Int. Cl.[4] .......................... B23D 19/04; B26D 1/24

[52] U.S. Cl. .......................................... 83/500; 83/501; 83/676

[58] Field of Search .......................... 83/500, 501, 676

[56] References Cited

U.S. PATENT DOCUMENTS

| | | | |
|---|---|---|---|
| 577,985 | 3/1897 | Koegel | 83/501 |
| 802,572 | 10/1905 | King | 83/501 |
| 3,122,958 | 3/1964 | Washburn | 83/500 |
| 3,306,149 | 2/1967 | John | 86/676 |
| 3,459,086 | 8/1969 | Reeder, Jr. | 83/425 |
| 3,465,631 | 9/1969 | Reeder | 83/500 |
| 3,682,032 | 8/1972 | Pfeiffer | 83/496 |

*Primary Examiner*—Donald R. Schran

*Attorney, Agent, or Firm*—Hill, Van Santen, Steadman & Simpson

[57] ABSTRACT

A circular rotary slitter construction comprises a body hub having a circular perimeter and at least one axially facing surface. A cutting edge hoop cylinder is fixedly mounted on the body hub perimeter. At least that portion of the axially facing surface contiguous to the hoop cylinder is axially inset from an annular cutting edge of the hoop cylinder so that the annular cutting edge margin of the hoop cylinder overhangs the contiguous axially facing surface cantilever fashion and the cutting edge is axially outwardly spaced relative to the contiguous axially facing surface. The hoop cylinder is adapted to be made from tool steel and the body hub is adapted to be made from a more easily machined material such as aluminum and at least partially from a suitable plastic material.

6 Claims, 4 Drawing Figures

NON-DULLING SLITTER

BACKGROUND OF THE INVENTION

1. Field of the Invention

This invention relates in general to the art of shearing continuously running web material such as paper, and is more particularly concerned with rotary slitter apparatus wherein cooperating slitter elements often refer to as a slitter and a slitter band slit the web as the web travels longitudinally through the slitter.

2. Description of Prior Art

Slitters of the kind with which the present invention is concerned are well represented in U.S. Pat. Nos. 3,122,958; 3,459,086 3,682,023, the disclosures of which to any extent necessary are incorporated herein by reference, and in particular as to advantageous orientations of the cooperating rotary slitter members. A major problem that these patents have addressed has been the attainment of clean severance with minimum dust generation and clean non-frayed edges on the slit web. In addition, these patents present various schemes for improving the wearing qualities of the cooperating slitting edges of the rotating slitter elements.

However, there is still room for improvement in the cutting edges of the rotary slitter element. When it is considered that the slitters operate at web running speeds of up to 6,000 feet per minute it will be appreciated that the wear factor is of considerable concern. In U.S. Pat. No. 3,122,958 it was proposed to prolong slitter life by applying a bonded thin layer of spark-deposited carbide surface on the perimeter or axial face of the rotary slitter elements, together with beveling of the slitter member back of the applied hard layer and running out to the edge of the layer to afford support for the cutting edge of the slitter member.

In U.S. Pat. No. 3,459,086, it is indicated that a thin hardened layer of wear resisting material such as tungsten carbide or aluminum oxide applied as by flame coating process may be used, similarly as in U.S. Pat. No. 3,122,958. In addition, a suggestion is made that the outer layer may be in the form of a separate band which is shrink-fitted in place, with a machining or grinding of the outer surface to obtain concentricity. However, this U.S. Pat. No. 3,459,086 indicates the necessity of providing complete underlying support for the hardened peripheral layer, and much attention is given to the effects of wear on the cutting action of the band and blade.

In U.S. Pat. No. 3,682,032 the problem is attacked by provision of lips formed on the body of the blade, with a hardened layer on the perimeter over the lip and coextensive with the axial dimension of the lip.

SUMMARY OF THE INVENTION

An important object of the present invention is to provide a new and improved rotary slitter construction which provides a cutting edge which is long lasting and substantially non-dulling in operation for the intended purpose. In particular, the present invention provides a new and improved rotary slitter cutting edge which frees the body or hub structure of the slitter from involvement in the slitting action, in contrast to prior practice, such as exemplified in the foregoing U.S. patents.

To this end, the present invention provides a circular slitter comprising a hub having a circular perimeter and at least one axially facing surface, a cutting edge cylinder fixedly mounted on the hub perimeter, and at least that portion of the axially facing surface contiguous to the cylinder being axially inset from an annular margin of the cylinder so that an annular margin of the cylinder overhangs the axially facing surface cantilever fashion and provides a cutting edge extending in axially outwardly spaced relation to the contiguous portion of the axially facing surface of the hub.

Other objects, features and advantages of the present invention will be readily apparent from the following description of certain representative embodiments thereof, taken in conjunction with the accompanying drawing, although variations and modifications may be effected without departing from the spirit and scope of the novel concepts embodied in the disclosure, and in which:

BRIEF DESCRIPTION OF THE DRAWINGS

As seen in FIGS. 1 and 2, a slitter assembly comprises a slitter disk 10 and a cooperating slitter 11 sometimes referred to as a slitter band, the slitter band underlying a web W being slit and the slitter 10 overlying the web. As is customary, the upper slitter 10 may be of a smaller diameter than the lower slitter 11. A keyed shaft 12 mounts the upper slitter 10 and a key shaft 13 mounts the lower slitter 11. While the slitter assembly may be rotatably driven by power means coupled to the shaft of one of the slitter elements, such as the upper slitter shaft 12, the slitter assembly of the present invention is adapted to be web driven, that is by slitting engagement of slitting edges of the slitter members with the web W being slit. The slitter elements are caused to rotate and thus effect progressive clean slitting of the web. It will be appreciated that where a particular web is to be slit into a plurality of longitudinal sections, as many as necessary of the rotary slitter assemblies may be mounted in the slitting apparatus.

Figure 1:
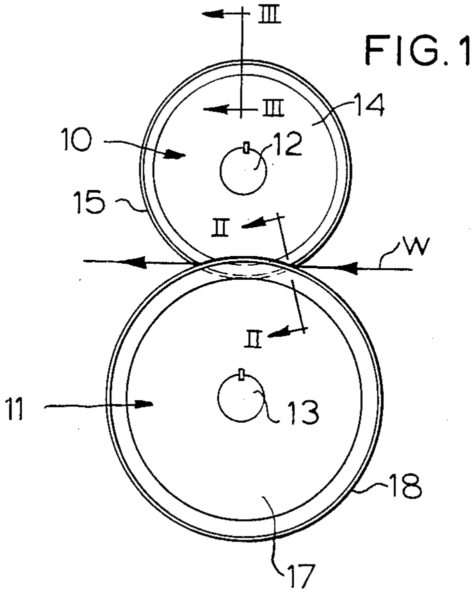
FIG. 1 is a more or less schematic side elevational view of a slitter assembly embodying the invention.
Figure 2:
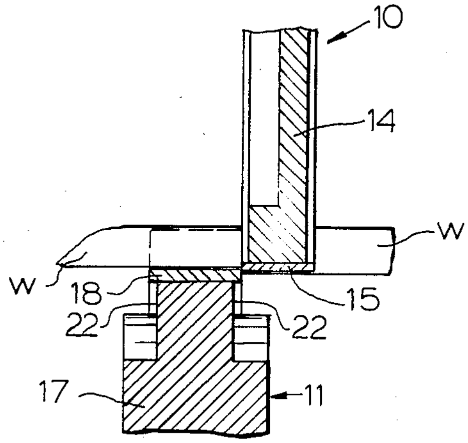
FIG. 2 is an enlarged fragmentary sectional detail view taken substantially along the line II—II of FIG. 1.

According to the present invention new and improved slitter edge means are provided to this end, the slitter member or element 10 has a body hub 14 which has mounted on its circular perimeter a cutting edge cylinder 15. To the same effect, the circular slitter member or element 11 has on the cylindrical perimeter of its body hub 17 a cutting edge cylinder 18.

Desirably the cutting edge cylinders 15 and 18 are formed from a hard, highly wear resistant material such as tool steel. On the other hand, the body hubs 14 and 17 are desirably made from an easily machined low cost material such as aluminum, which in addition to other advantages may serve as a heat sink for the associated cutting edge cylinder. In addition, the aluminum construction of the body hubs 14 and 17 is especially adaptable for conveniently effecting shrink fitting of the respective cutting edge cylinders 15 and 18 in place on the body hubs. Such shrink fitting is adapted to be affected by chilling and shrinking the body hubs 14 and 17, and heating and expanding the cutting edge cylinders 15 and 18 and then assembling and permitting the elements to return to ambient temperature wherein the body hub expands and the cutting edge cylinder contracts into the shrink fit relation. After the shrink fit assembly has been completed, and the cutting edge cylinders are firmly mounted, any tendency for migration of the cutting edge cylinders in service relative to the supporting body hubs may be precluded by pinning the members together in any suitable manner, as for example exemplified in FIG. 3 by means of a pinning screw 19 having a head 20 countersunk within the outer perimeter of the cutting edge cylinder so as to avoid any interference with travel of the web W on the perimeter of the cutting edge cylinder. Although the pinning has been demonstrated in respect to the cutting edge cylinder 15 of the slitter member 10, it will be understood that a similar positive anchoring of the cutting edge cylinder 18 to the body hub 17 of the slitter element 11 may be effected.

In a preferred construction, the cutting edge cylinders 15 and 18 are for the normal sizes of the slitter assemblies as employed in paper web slitter formed from material which is substantially accurately machined in a flat strip of the tool steel of about 0.10 to 0.015 inch in thickness. The strip is then accurately shaped to cylindrical form on a suitable mandrel and a jig for this purpose and the ends of the circularly formed strip are welded by focused energy, e.g. electronic beam welding which has the advantage of utilizing welding material which is the same as the material of the hoop providing the cutting edge cylinder. Thereby the weld will be the same thickness and texture as the rest of the cylinder.

A width is selected for each of the cutting edge hoops or cylinders 15 and 18 which will enable at least one margin of the cylinder to overhang an axially facing surface of the associated body hub. Preferably both margins of the cutting edge cylinders provide cutting edge overhangs with respect to the respective axiallly facing surfaces of the associated body hub. A cantilever extension overhang for each of the cutting edges of about 0.015 to 0.040 inch is preferred. By having the axially facing surfaces of the body hubs substantially inset from the cutting edges of the cylinders, maintenance of accurate point contact slitting relation of the two cooperating slitting members can be readily maintained and full advantage can be taken of the thin cutting edges afforded by the cutting edge cylinders. As shown, the body hub 14 of the slitter members 10 has oppositely axially facing surfaces 21 which are inset from the cutting edges of the cutting edge cylinder 15. To the same effect the body hub 17 of the slitter band member 11 has axially oppositely facing surfaces 22 which are effectively inset from the cutting edges of the cutting edge cylinder 18.

Figure 4:
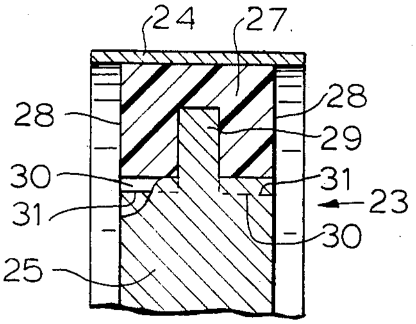
FIG. 4 is a fragmentary sectional view similar to FIG. 3 but showing a modification.

In a modified arrangement as shown in FIG. 4, means are provided in a circular slitter member 23 for shock and vibration absorption between a cutting edge cylinder 24 and a hub body 25 of the slitter member. Similarly as described in connection with the circular slitter members 10 and 11, the cutting edge cylinder 24 is adapted to be made from tool steel, while the body hub 25 is adapted to be made from a less expensive material such as aluminum, although other materials such as low carbon cold roll steel or the like may be employed. Interposed between the cutting edge cylinder 24 and the body hub 25 is an annulus 27 formed from a suitable, preferably thermosetting plastic material of high heat resistance and shock absorption characteristics. Axially opposite sides 28 of the plastic mounting buffer ring 27 is inset from the cutting edge of the cutting edge cylinder 24 similarly as described in connection with the slitter members 10 and 11.

Figure 3:
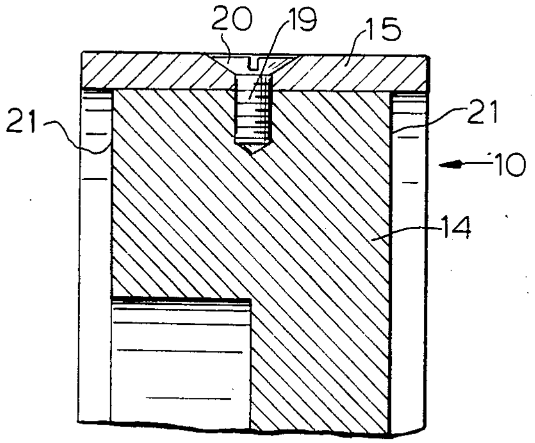
FIG. 3 is an enlarged fragmentary sectional detail view taken substantially along the line III—III of FIG. 1.

For anchoring the cutting edge cylinder 24 against creeping relative to the supporting buffering 27, a similar anchoring expedient as described in connection with FIG. 3 may be utilized. For thoroughly anchoring the plastic ring 27 to the metallic hub body 25, an annular axially centered radially outwardly project anchoring fin rib 29 is provided on the body hub 25 and is embedded in the plastic ring 27 whereby to stabilize the composite axially. For positively retaining the plastic ring 27 against circumferential creep, one or a plurality of axially extending integral keys 30 at the inner diameter of the plastic ring 27 are engaged in corresponding key ways 31 in the engaged perimeter of the body hub 25. It will be appreciated, that the plastic ring 27 is adapted to be molded in place onto the body hub 25. The plastic material of the ring 27 is easily machined or ground to the precise cylindrical and axial shape desired. The structure of FIG. 4 may be employed in either or both of the upper slitter disc or the lower slitter band, although for shock and vibration absorption it may be preferred to equip only the upper slitter disc member with this construction.

It will be understood that variations and modifications may be effected without departing from the spirit and scope of the novel concepts of this invention.

I claim as my invention:

1. A circular rotary slitter, comprising:

a body hub formed from an easily machined material and having an annular axially centered radially outwardly projecting anchoring fin rib embedded in a buffer ring engaged about the body hub and providing a circular perimeter and axially oppositely facing surfaces extending to said perimeter;

a hoop shaped cylinder formed from thin tool steel and firmly mounted on said perimeter;

said cylinder having opposite margins projecting axially in overhanging relation to said surfaces and providing cutting edges which are substantially axially offset from the adjacent axially facing surfaces; and said buffer ring being a shock and vibration absorbing member between said body hub and said cylinder.

2. A circular rotary slitter according to claim 1, wherein said buffer ring is a plastic ring providing said circular perimeter.

3. A circular rotary slitter according to claim 1, wherein said cylinder is 0.010 to 0.015 thick and said margins extend 0.015 to 0.040 inch from said axially facing surfaces.

4. A circular rotary slitter according to claim 1, including means securely retaining said cylinder against displacement relative to said body hub.

5. A circular slitter, comprising:

a body hub formed from aluminum and having a cylindrical perimeter of substantial width, and at least one axially facing surface;

a tool steel hoop cutting edge cylinder fixedly embracing said cylindrical perimeter in uniform intimate shrink fit contact therewith;

and at least that portion of said axially facing surface contiguous to said cylinder being axially inset from an annular edge of said cylinder so that the adjacent annular margin of the cylinder overhangs said surface cantilever fashion and said cutting edge is axially outwardly spaced relative to said contiguous surface; and said hub serving as a heat sink for said cutting edge cylinder.

6. A circular rotary slitter according to claim 5, wherein said tool steel cylinder has a thickness from 0.010 to 0.015 inch thickness and said margin of the cylinder extending from 0.015 to 0.040 inch overhang relation to said axially facing contiguous surface of the body hub.

* * * * *